United States Patent Office 3,274,235
Patented Sept. 20, 1966

3,274,235
CYCLOHEXYLMETHYL TOLUATES
Henry E. Hennis, Midland, Mich., assignor to The Dow Chemical Company, Midland, Mich., a corporation of Delaware
No Drawing. Filed Sept. 7, 1962, Ser. No. 222,213
4 Claims. (Cl. 260—476)

The present invention is concerned with organic chemistry and is particularly directed to the cyclohexylmethyl esters of toluic acids, corresponding to the formula

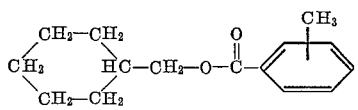

Under ordinary conditions the compounds are white to colorless solids or colorless liquids, slightly soluble in water, readily soluble in acetone, 95 percent ethanol, xylene, and similar organic solvents. The compounds are useful for the control of mites, insects and nematodes, and have herbicidal and fungicidal properties.

The compounds are prepared by esterifying cyclohexylmethanol with a toluic acid, or with an alternative acid source such as a toluic acid anhydride, or an ester thereof, other than cyclohexylmethyl; or a toluoyl halide. Preparation of the present compounds consumes the alcohol and acid, ester, or halide starting material in equimolecular proportions, or anhydride in proportions half equimolecular with alcohol. The employment of such proportions in reaction mixture is efficient. Other amounts may be employed if desired. When employing acid and alcohol, water of reaction is stoichiometrically formed and its formation may be taken as an indication of progress of reaction. It can be removed readily in known procedures as by azeotropic distillation.

In carrying out the reaction to prepare the present compounds, toluic acid or other such acid source as has been mentioned is intimately mixed and stirred together with cyclohexylmethanol, desirably in the presence of an acidic esterification catalyst. The reaction goes forward smoothly at temperatures over a wide range, and is preferably carried out with moderate heating, as, for example, at the temperature of boiling water. Advantageously, the reaction is carried out in an inert liquid reaction medium, such as toluene, xylene, or the like. Preferably such reaction medium should be capable of forming a water azeotrope whereby, in carrying out the reaction under reflux equipped with water separator and at the boiling temperature of the reaction medium, water of reaction is continuously removed as it is formed. Some product is formed immediately upon contacting of the reactants. Upon completion of the esterification reaction, a crude product is present in good yield and may be employed in that form if desired. When it is desired to obtain the product in the absence of such impurities as catalyst and reaction medium, pure product may be separated in known methods, for example, by neutralizing and washing away catalyst and by fractional distillation.

The following examples, without more, will enable those skilled in the art to practice the present invention.

*Example I*

Into a 2-liter 3-necked round-bottomed flask equipped with a motor stirrer, thermometer, and azeotropic distillation column was placed 272.3 grams (2 gram moles) of o-toluic acid, 228 grams (2 gram moles) of cyclohexylmethanol, 10 grams of p-toluenesulfonic acid as catalyst, together with 500 milliliters of toluene. The resulting reaction mixture was heated with stirring, continuously over a period of between 4 and 6 hours, during which time water of reaction formed and was continuously removed from the reaction mixture by azeotropic distillation with reflux of solvent. At the conclusion of the reaction time, the resulting reaction mixture was allowed to cool and was then poured into 500 grams crushed ice. As a result of these procedures, ice melted and the resulting mixture separated into aqueous and organic phases. The phases were separated, and the organic phase layer washed twice with 500 milliliter portions of aqueous 5 percent sodium bicarbonate solution and thereafter twice with 500 milliliter portions of water. The resulting washed organic solution was thereafter fractionally distilled at gradually increasing temperatures and declining subatmospheric pressures whereby there was obtained a cyclohexylmethyl ester of o-toluic acid, as a colorless liquid boiling at 110–112° C. under a pressure of 0.07 millimeter mercury, absolute. The product liquid had a refractive index n/D at 25° C. of 1.5189. Upon the basis of elemental analysis, its purity was calculated to be 99%. The assigned structure is confirmed by infrared analysis.

An aqueous dispersion was prepared, containing as sole toxicant, the compound of the present example: this was applied to an area planted with weed seeds. Application was at the rate of 50 pounds of toxicant per acre of treated area. From this application there resulted the inhibition of the growth of seeds and germinant seedlings of radish and cranberry bean plants.

Also, application to a population of American cockroach of an aqueous composition containing the present substance at the rate of 1 lb. per hundred gallons resulted in a kill of a substantial part of the cockroaches.

In synthetic procedures similar to those indicated, foregoing, there were prepared the cyclohexylmethyl esters of m and p-toluic acids. The products were prepared in good yield. Cyclohexylmethyl p-toluate was found to be a pale yellow solid melting at 47–48° C. and boiling at 110–111° C. under a pressure of 0.1 millimeter mercury, absolute. Cyclohexyl m-toluate was found to be a colorless liquid under ordinary conditions, boiling at 109–110° C. under 0.1 millimeter mercury pressure, absolute, and to have a refractive index n/D of 1.5161 at 25° C. Upon the basis of elemental analysis and confirmatory infrared spectrum data, the structures were confirmed and the products ascertained to be approximately 99% pure. Both were found to be soluble to the extent of less than 1% in water; readily soluble in acetone, ethanol, xylene, and mixed lower aliphatic hydrocarbon liquids.

I claim:
1. Compound of the formula

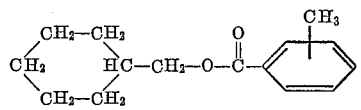

2. Cyclohexylmethyl o-toluate.
3. Cyclohexylmethyl p-toluate.
4. Cyclohexylmethyl m-toluate.

References Cited by the Examiner
UNITED STATES PATENTS
2,441,183    5/1948    Bludworth et al. _____ 260—468

LORRAINE A. WEINBERGER, *Primary Examiner.*
LEON ZITVER, *Examiner.*
R. E. MASSA, T. L. GALLOWAY, S. B. WILLIAMS,
*Assistant Examiners.*